United States Patent
Wallenius

(10) Patent No.: US 6,625,268 B1
(45) Date of Patent: Sep. 23, 2003

(54) SUPPORTING SUPPLEMENTARY SERVICES IN AN INTELLIGENT NETWORK

(75) Inventor: Jukka Wallenius, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/596,450

(22) Filed: Jun. 19, 2000

Related U.S. Application Data

(63) Continuation of application No. PCT/FI98/01020, filed on Dec. 23, 1998.

(30) Foreign Application Priority Data

Dec. 23, 1997 (FI) .................................................. 974626

(51) Int. Cl.[7] ............................................ H04M 15/00
(52) U.S. Cl. ............................ 379/114.28; 379/114.01; 379/114.29; 379/229; 379/230
(58) Field of Search ......................... 379/111, 112.01, 379/112.05, 114.01, 114.2, 114.06–114.1, 114.12, 115.01, 120, 121.02, 127.01, 114.28, 114.29, 292–230; 455/406–411

(56) References Cited

U.S. PATENT DOCUMENTS

| 5,511,113 A | 4/1996 | Tasaki et al. |
|---|---|---|
| 5,535,263 A | 7/1996 | Blumhardt |
| 5,592,535 A | 1/1997 | Klotz |
| 6,044,259 A | 3/2000 | Hentilä et al. |
| 6,118,860 A | * 9/2000 | Hillson et al. |
| 6,195,543 B1 | * 2/2001 | Granberg |

FOREIGN PATENT DOCUMENTS

| DE | 43 12 362 A1 | 10/1994 |
|---|---|---|
| EP | 0715 473 A2 | 6/1996 |
| EP | 0740 480 A2 | 10/1996 |
| EP | 0750 433 A1 | 12/1996 |
| FI | 100496 B | 10/1996 |
| FI | 98181 | 4/1997 |
| FI | 100075 B | 9/1997 |
| GB | 2 254 224 A | 9/1992 |
| WO | WO 96/20571 | 7/1996 |
| WO | WO 97/48245 | 12/1997 |

* cited by examiner

*Primary Examiner*—Duc Nguyen
(74) *Attorney, Agent, or Firm*—Squire, Sanders & Dempsey L.L.P.

(57) ABSTRACT

Known intelligent network architectures do not comprise a mechanism by means of which it would be possible to notify a service control point (SCP) of a recurrent use of supplementary services or of the activation of the supplementary services at a service switching point (SSP). In accordance with the invention, the service control point (SCP) informs a mobile services switching center (MSC) in a message RequestNotificationCharging of the events the mobile services switching center (MSC) is to report to the service control point (SCP). The mobile services switching center (MSC) reports the existence of said events to the service control point (SCP) in a message EventNotificationCharging.

22 Claims, 3 Drawing Sheets

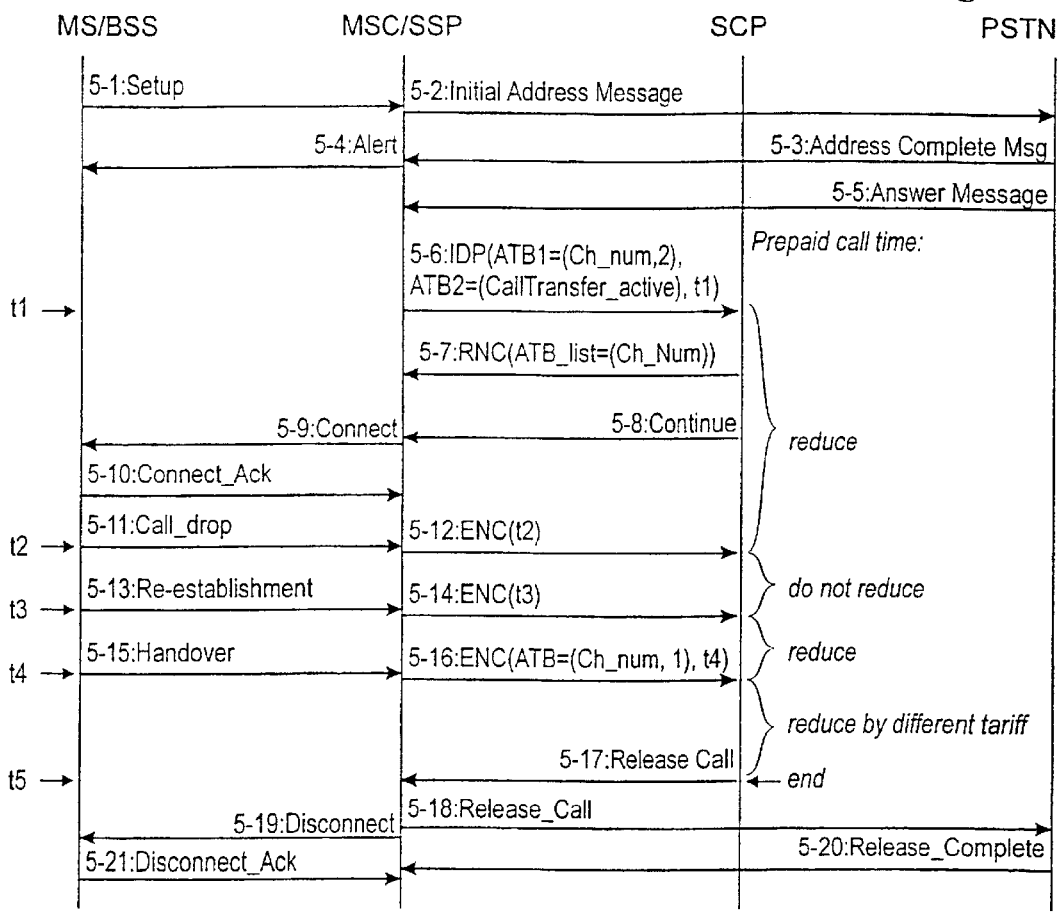
Fig. 5
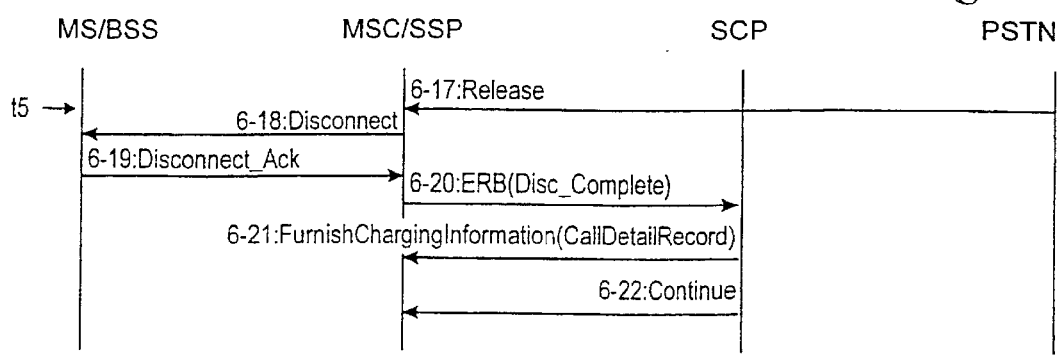
Fig. 6
```
MSISDN/IMSI/IMEI/PSTN-number
t1 Charging start time, Ch_num=2, Call_Transfer=Off
t2 Call drop
t3 Re-establishment, Ch_num=2
t4 Handover, Ch_num=1
t5 Release
```
Fig. 7

SUPPORTING SUPPLEMENTARY SERVICES IN AN INTELLIGENT NETWORK

This application is a continuation of Application No. PCT/FJ98/01020 filed Dec. 23, 1998.

BACKGROUND OF THE INVENTION

The invention relates to a method and equipment for implementing supplementary services to be taken into account in intelligent-network-based charging mechanisms.

An intelligent network (IN) is able to provide a subscriber of a telecommunications network, such as a wired network or a mobile telephone network, with a plurality of various services. Such services include a virtual private network (VPN) which allows the use of short numbers between subscribers belonging to a local network, and a personal number in which the intelligent network reroutes the calls directed to a personal number in a manner controlled by the subscriber. An example of such an intelligent network is described in recommendations of the ITU-T Q-1200 series, of which Q-1210 to Q-1219 define a set of features known as CS-1 (Capability Set 1), and correspondingly, Q-1220 to Q-1229 define a set of features CS-2. The invention and its background will be described by the terminology of recommendation ETS 300 374-1 CoreINAP, but the invention can also be used in intelligent networks implemented according to other intelligent network standards.

A basic call state model (BCSM), defined in connection with the intelligent network, describes different stages of call control and includes the points at which call control can be interrupted in order to start an intelligent network service. It identifies the detection points in the call and connection process at which service logic entities of the intelligent network can have an interactive relationship with basic call and connection management features.

Referring to FIG. 1, one or more service control functions (SCF) are associated with intelligent network architecture. The equipment or network element carrying out the tasks determined for the SCF is called a service control point (SCP). Within the scope of the present application, SCF and SCP are equal, and will hereinafter be called SCP. The SCP gives call set-up instructions to the exchange, or the exchange may inquire call set-up instructions from the SCP. If the interface of subscriber B is found to be busy at some stage, of call set-up, for example the call can be directed to an alternative number. FIG. 1 also shows other elements of an intelligent network which are relevant to the understanding of the invention, such as a call control function (CCF) comprising high-level call handling functions of an exchange EXC1, EXC2, such as establishing and releasing transfer connections. Service data function SDF and service data point SDP form a database comprising subscriber-specific and/or service-specific information. Specialized resource function SRF is an interface for network mechanisms associated with interaction with a subscriber. It can be associated with what are known as intelligent peripherals (IP) and comprise, for example, more advanced speech handling functions than do exchanges in general.

Service switching function (SSF) is an interface between the call control function CCF and the service control function SCP. The network element carrying out the SSF is called a service-switching point (SSP). An intelligent network service is produced by the service switching point SSP inquiring instructions from the service control point SCP by means of messages to be transmitted across the SSP/SCP interface upon the encounter of detection points associated with the services. In intelligent network terminology these messages are called operations. In connection with an intelligent network service, a service program is started at the service control point SCP, the operation of the program determining the operations transmitted by the SCP to the SSP at each stage of a call.

FIG. 2 shows the operation of a prior art intelligent network at detection points. In step 2-1 the SSP transmits to the SCP an InitialDP operation containing the necessary data for setting up a call. Next, the detection points are armed at the SSP. In step 2-2 the SCP transmits to the SSP a message RequestReportBCSMEvent, notifying the SSP which encounters of the detection points it is to report to the SCP. Next, in step 2-3, the SCP typically transmits charging and/or interaction operations, such as FurnishChargingInformation (store charging information associated with the intelligent network service) or PlayAnnouncement (supply subscriber with an announcement associated with the intelligent network). In step 2-4 the SCP transmits to the SSP a routing instruction, such as CollectInformation (collecting dialling information from the subscriber), Connect (route call to a new number), Continue (continue call set-up with the same data) or ReleaseCall (release the connection). In intelligent network recommendations, call set-up is divided into given rough phases called Point-In-Calls (PICs). It is possible that the SSP has been configured to continue call set-up from phase PIC 2 in response to a CollectInformation operation and to continue call set-up from PIC 3 in response to a Connect operation, and so on.

There are two kinds of detection points. The above events in FIG. 2 relate to a detection point called a trigger detection point (TDP). The SSP may make an initial inquiry to the SCP in connection with such a TDP detection point, and receives instructions for call set-up. Another type of detection point is what is known as an event detection point (EDP). 2-5 in FIG. 2 shows the moment when such an EDP detection point is encountered during call set-up. The SSP reports the encounter of the detection point DP# to the SCP which transmits more call set-up instructions to the SSP in step 2-7.

The above intelligent network architecture can also be applied to a mobile communication system, in which case exchanges EXC would be replaced by a mobile services switching centre MSC. It should be noted that the SCP can be implemented as an internal process within an exchange, and charging control between the SCP and the SSP (i.e. the SCF and the SSF) then takes place within the exchange. The interface is not necessarily a CoreINAP interface, but it can be any interface having the corresponding features.

It is a problem in known intelligent network architectures, particularly in connection with mobile communication systems, that they do not define a mechanism by means of which the service control point SCP could be notified of the use of supplementary services or of the activoatin of the supplementary services at the service switching point SSP. This is especially a problem when supplementary services or supplementary operations are recurrently reported during a call. One recurrently reported matter is the change in the number of in-call channels in high-speed data transmission in which several channels are assigned to a single call. Another similar situation is Quality of Service (QoS) of an ATM connection, comprising such parameters as transmission rate, maximum delay and probability of packet loss. A third example of supplementary services which are recurrently reported is the use of what is called a prepaid SIM card (prepaid SIM service). The purpose of this service is to provide a mobile communication system of the GSM type with prepaid SIM cards (Subscriber Identity Module). The use of these cards is similar to that of a prepaid phonecard, i.e. the user of a mobile station can purchase a smart card similar to the SIM card, in which a call time is preprogrammed for a given sum of money. Although for the subscriber the use of the prepaid SIM card is similar to that of the prepaid phone card, its operation is totally different for a network and for a telephone operator, since equipment which reduce call time programmed in the card cannot be installed in the mobile station (at least afterwards). In case it is a desire to implement such a prepaid SIM service, it is to be done on the network side. The above intelligent network standards are not provided with a mechanism to inform the service control point SCP of such services.

Detection points defined in network architectures are a primary mechanism to report different events. There are two different kinds of detection points. Event detection point response required (EDPR) is a detection point upon the encounter of which the handling of the call stops at the switching point until the service control point SCP sends further instructions. Event detection point notification (EDPN) is a detection point upon the encounter of which the SSP simply transmits a message to the SCP and continues without further instructions from the SCP. The EDPR detection points have a quality of forming a what is called a control relationship. Only one control relationship can be associated with a call in accordance with intelligent network standards. A problem associated with the EDPR detection points is therefore that they prevent more supplementary services from being produced. On the other hand, a problem associated with the EDPN detection points is that after a detection point is encountered and reported, it is no longer armed. Consequently, they are not suitable for reporting recurrent events.

BRIEF DESCRIPTION OF THE INVENTION

An object of the invention is to provide a mechanism suitable for reporting recurrent events in intelligent networks. In this context, an event mainly refers to the initial states of and the changes in factors which affect call charging. These data can also be called call attributes. The objects of the invention are achieved by a method which is characterized by what is disclosed in the independent claims. The preferred embodiments of the invention are disclosed in the dependent claims.

Firstly, the invention is based on the surprising finding that messages defined in prior art intelligent network architectures and associated with different detection points are not suitable for reporting recurrent events. Such recurrent events occur particularly in mobile communication systems in which a mobile station may enter a shadow region or change its location area while moving, whereupon the criteria of charging the mobile station may change, for some reason or other. The normal mechanism to report detection points is that the detection points which are to be reported to the SCP by the SSP are transmitted as parameters to a message RequestReportBCSMEvent by the SCP. Correspondingly, the SSP reports the encounter of these detection points in a message EventReportBCSM. In principle, these messages could be implemented differently so as to solve the above problems. However, this would require a significant change in standardization. Another option would be simply to re-arm the detection points after each report. However, this would result in a significant message traffic between the service switching point SSP and the service control point SCP. A better result is obtained if given messages defined in intelligent network standards are used in a new manner and sense. Messages particularly suitable for use include RequestNotificationCharging and EventNotificationCharging according to CoreINAP recommendations, the detailed contents of the messages being undefined. It is an advantage of the method of the invention that it is also suitable for reporting recurrent current events. Before starting charging, the service control point SCP may request the service switching point SSP to report on the events which affect call charging, whereby the SCP is capable of influencing the call charging in a variety of ways.

The method according to a first preferred embodiment of the invention for reporting events which affect a call tariff is therefore characterized in that:

call tariff formation is based on at least one attribute representing call state and/or at least one call-related resource, service and/or supplementary service;

the service control point forms the call tariff at the very beginning of tariff monitoring on the basis of an initial value of said at least said one attribute of which it has been notified by the service switching point;

during a call, the service switching point reports to the service control point at least those call-related events in which said at least one attribute may change;

in response to the report from the service switching point, the service control point re-forms the existing call tariff.

The service switching point is preferably configured to report at least given types of events without a separate request from the control point. In addition, the service control point may preferably improve a configuration which includes a default value by notifying the service switching point of events which are to be reported by the service switching point.

A preferably reported matter deals with resources assigned to the call and/or resource changes, the resources comprising transmission connection quality and/or data rate, such as the number of channels in high-speed data transmission. To reduce the number of separate messages the switching point may notify the service control point of the initial state of the resources as early as in an intelligent network service activation command. In addition, the switching point preferably reports the events in report messages, each report comprising the corresponding event and/or the points of time at which the resource change takes place. Hence, the control point SCP will be notified of the exact time of the event, even if the report is for some reason delayed. Such events may include supplementary service activation, call release, call re-establishment, data rate change, entry into and return from a shadow region by a mobile station, and a tariff change based on time.

Furthermore, a connection without control relationship is preferably established between the service switching point and the service control point, and the events on said connection without control relationship are preferably reported by the switching point. In this way, other supplementary services are not hampered or prevented from being activated.

The invention does not require any changes in equipment. It only requires slight changes in software of the service control point and the service switching point and/or in the intelligent network standard, as the invention can be implemented by the use of the existing messages in a new manner for a new purpose. For example, the invention is suitable for use in supporting the following types of services in the intelligent network:

formation of a charging record at the SCP on the basis of information reported by the SSP (this feature enables different types of in-call events to flexibly influence the contents of the charging record);

tariff transmission from the SCP to the SSP as a response to the event data obtained;

forwarding of the charging record or charging data to a person having rented a telephone without a need to post-process the charging records, which would normally take place in a billing centre;

restriction on an in-call tariff;

use of the above-mentioned prepaid SIM card.

In accordance with a preferred embodiment, no control relationship is used between the service control point SCP and the service switching point SSP during reporting, the connection of the invention between the SCP and the SSP then making it possible to affect the charging records (by SendChargingInformation and FurnishChargingInformation operations, for instance). Consequently, other services requiring an in-call control relationship are not prevented from being started (such services include hold, enquiry call, call transfer, and so on). In-call events which are caused and/or reserved by an intelligent network service which requires a control relationship are reported to the charging connection in all cases irrespective of other possible services and the fact that the intelligent network service has reserved data on the events.

It is a significant advantage that the request by the SCP to report the events which affect charging is to be sent only once. In other words, there is no need to repeat the request each time an event which affects charging is carried out. The exchange notifies the SCP of the tariff data at the beginning of the call. It can request the SSP to report the following types of events which affect charging:

answer and call release;

entry into and return from a shadow region by a mobile station subscriber (in which case time charging is stopped and re-started, respectively, in accordance with the GSM recommendations, for example);

information on handover (in which case a frequency range and/or the number of channels used in high-speed data transmission may change);

in-call supplementary service (such as hold, enquiry call, call transfer, and so on), possibly via another SCP connection;

call tariff change.

In addition, each event preferably includes a corresponding time stamp. In accordance with a simple alternative, the SCP forms a time stamp on the basis of its own clock. However, time charging is more accurate if the MSC/SSP attaches a corresponding time stamp to each report. Consequently, the report messages become somewhat longer. However, time charging is accurate even if the MSC/SSP would not manage to transmit the report message immediately after the detection of the event to be reported. It is capable of reporting even several events in the same report message.

The SCP forms a charging record on the basis of the event reports, and their time stamps obtained by the SCP. In other words, the relevant time of the events is indicated by the time according to the time stamp rather than by the point of time at which the SCP received information on the event in question.

The report given by the SSP does not require an immediate reply from the SCP. The connection according to the invention allows the SSP to inquire the charging record of the call from the SCP upon the termination of the call, after the connections to the incoming and outgoing sides have been released by the exchange.

A service started next in turn can be notified of the existence of the SCP/SSP connection of the invention. A feature interaction manager (FIM, not separately shown) can then prevent another service which affects charging from being started, in case the services are incompatible, for example.

Call state models of the SSP call control function maintain information on the attributes which affect call charging. These attributes represent call features and resources assigned to the call. These attributes may include call-related supplementary services, the number of channels and the quality of a wired and/or wireless transmission path, and so on. Upon starting a call or a supplementary service, the SSP reports a list of enumerated attributes and their values to the SCP. The list is not necessarily a fixed one but it may vary according to the service to be started. The attributes to be reported to the SCP are defined in connection with intelligent network triggering. Using these attributes the SCP defines the call tariff in more detail. Besides the attributes, the SSP notifies the SCP of the basic tariff the SSP has obtained by a number analysis. A more accurate tariff is derived from the basic tariff by examining the attribute values. Correspondingly, the SCP gives the SSP a list of those attributes whose value changes are to be reported to the SCP. When a value of an attribute belonging to the latter list changes, the changed attribute and its value are reported to the SCP together with the time stamp of the moment of change. On the basis of this information, the SCP forms an altered tariff which is considered to be valid from the point of time indicated by the time stamp. Upon termination of the call the SCP forms an accurate charging record which is based on the period of validity of different attributes and information on complete charging interruptions (because the call is temporarily dropped, for example). The charging record is transferred for post-processing through the SSP, for example. The needs and restrictions set by the post-processing define the detailed structure of the charging record.

BRIEF DESCRIPTION OF THE DRAWINGS

In the following, the invention will be described in more detail by means of preferred embodiments with reference to the accompanying drawings, in which:

FIG. 5 illustrates how the invention is applied to the control of prepaid call time;

FIG. 6 illustrates how the invention is applied to the control of call time of a call to be charged, and FIG. 7 shows details of a charging record.

DETAILED DESCRIPTION OF THE INVENTION

Figure 1:
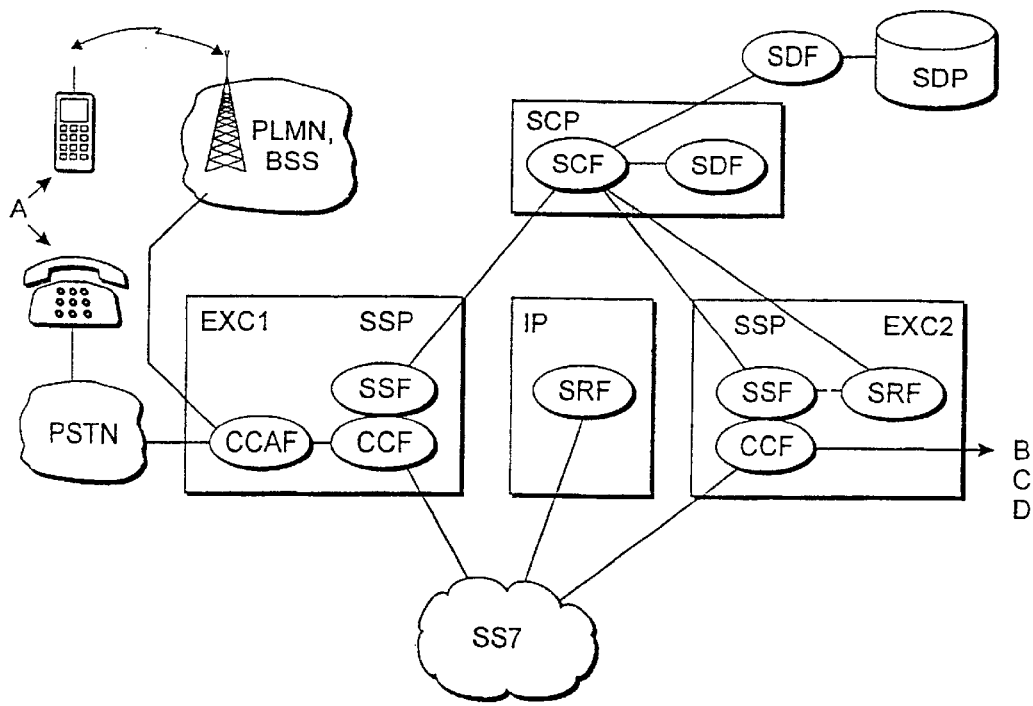
FIG. 1 shows parts of a known intelligent network architecture, which are relevant to the invention.
Figure 2:
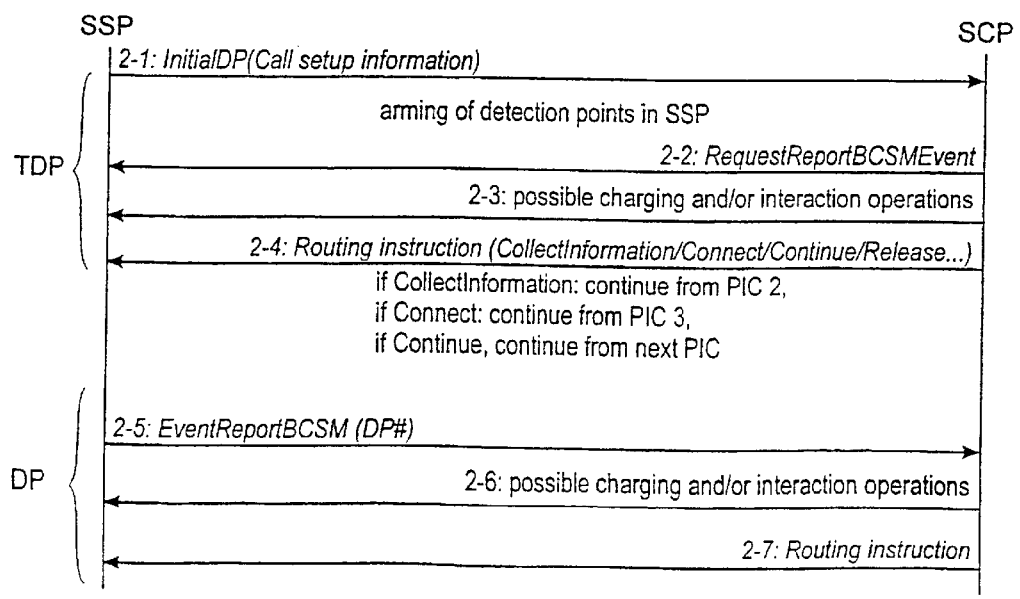
FIG. 2 shows the operation of a prior art intelligent network at detection points.
Figure 3:
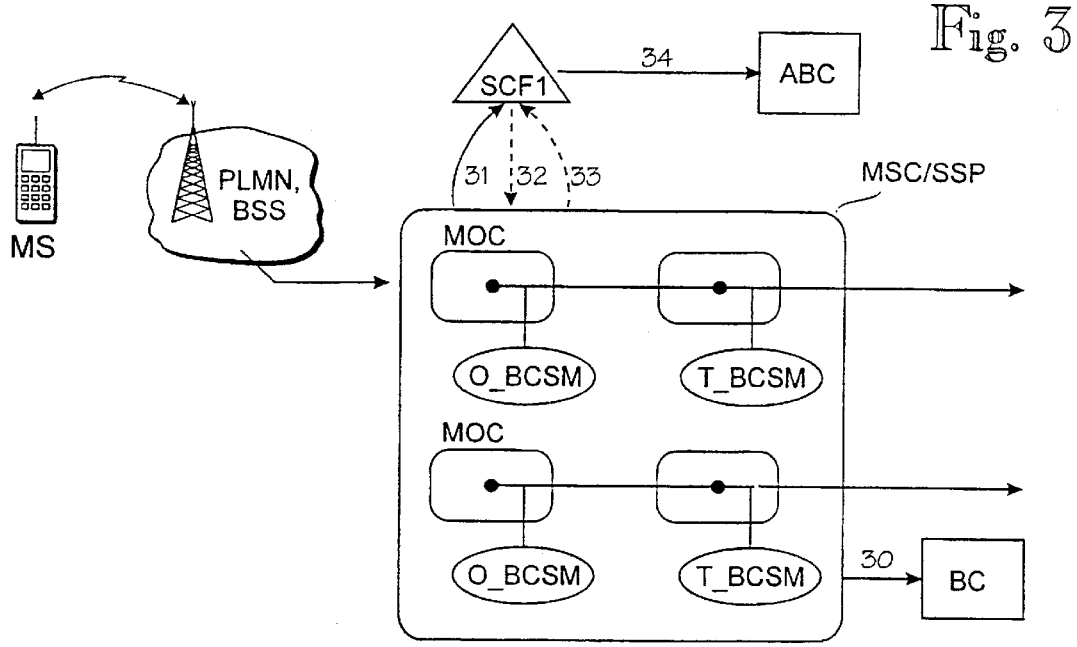
FIG. 3 shows events in a telephone exchange MSC including a service switching point SSP.

FIG. 3 shows events in a telephone exchange MSC including a service switching point SSP (the term MSC refers to a mobile services switching centre benefiting most from the invention. However, the mobile services switching centre MSC can be replaced by a telephone exchange of a wired network). Calls are modelled in the mobile services switching centre MSC by basic call state models BCSM. FIG. 3 shows two mobile originated calls (MOC). Call records 30 are formed of the calls and transmitted by the mobile services switching centre MSC to a billing centre (BC) FIG. 3 also shows an alternative billing centre (ABC). With the help of the latter it is possible to produce extremely dynamic services, such as car rental services.

An arrow 31 drawn with a solid line represents an initial detection point message (IDP) by means of which the mobile services switching centre MSC/SSP requests call set-up instructions from a control point SCP. An arrow 32 drawn with a dashed line represents a message RequestNotificationCharging by means of which the control point SCP notifies the mobile services switching centre MSC/SSP which events it is to report to the control point SCP. Such events may include an in-call enquiry call, setting up a conference call, the above-mentioned change in the number of channels in high-speed data-transmission, and so on. An arrow 33 drawn with a dashed line represents a message EventNotificationCharging by means of which the mobile services switching centre MSC/SSP notifies the control point SCP of an existence of an event which is of interest to the control point SCP. An arrow 34 represents charging instructions transmitted by the control point SCP (in this example to the alternative billing centre ABC).

Figure 4:
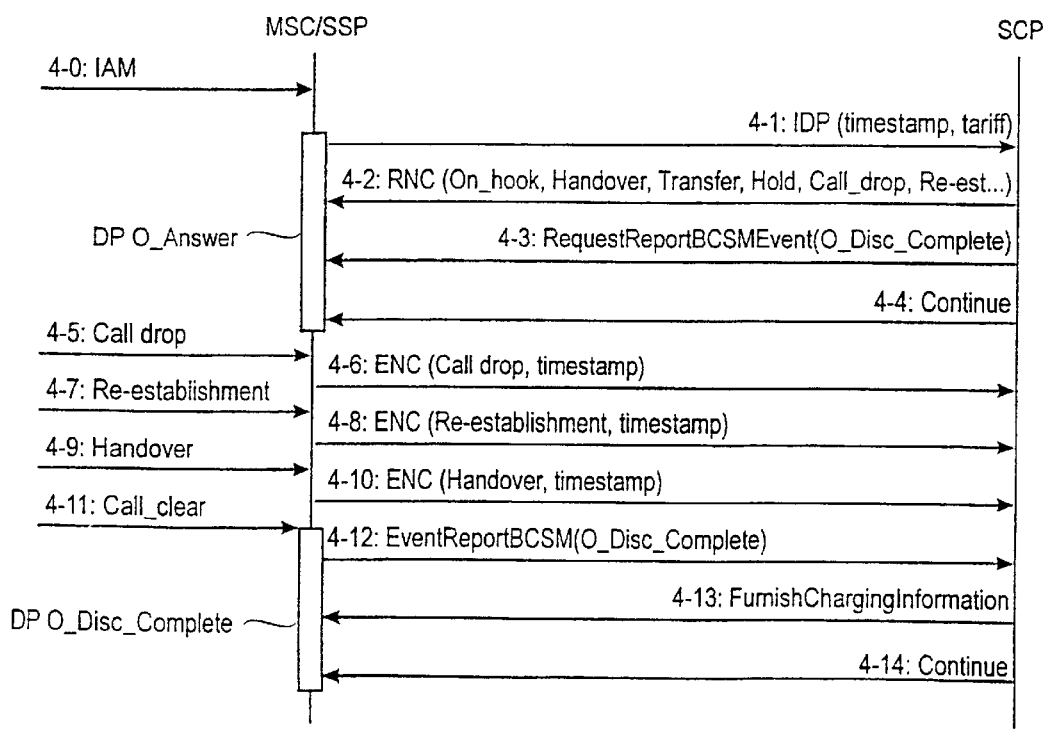
FIG. 4 is a signalling diagram illustrating the-operation of the invention.

FIG. 4 illustrates the use of the invention in the case of a mobile-terminating call. In step 4-0 an initial address message (IAM) arrives from a public switched telephone network PSTN to the mobile services switching centre MSC/SSP. In step 4-1 an SCP connection is triggered by transmitting an IDP message to the SCP. In step 4-2 the SCP transmits a message RequestNotificationCharging (RNC) to the mobile services switching centre MSC, notifying the MSC which events it is to report to the SCP. In this example, such events include call on hook, handover, call hold, call transfer, temporary call drop and call re-establishment. In step 4-3 the SCP transmits a message RequestReportBCSMEvent, requesting the mobile services switching centre to report given in-call events to the SCP. In this case, a detection point O_Disc_Complete, i.e. call release, is a parameter to the message. In step 4-4 the SCP transmits a message Continue, giving the mobile services switching centre permission to continue call set-up (this may be preceded by a message Response including call set-up instructions).

Steps 4-5 . . . 4-10 illustrate different types of in-call events which affect the formation of a call-related charging record. In step 4-5 the mobile services switching centre is notified of a subscriber entering a shadow region, and the mobile services switching centre notifies the SCP thereof in a message EventNotificationCharging in step 4-6. The notification on the event together with a time stamp are parameters to the message. Correspondingly, in step 4-7 the mobile services switching centre MSC is notified of call re-establishment, and the mobile services switching centre reports it in step 4-8. In step 4-9 the mobile services switching centre MSC is notified of handover which affects charging (such as the change in the number of channels in high-speed data transmission or the transfer of a dual-mode mobile station from a GSM state to a DCS state, or vice versa) and the mobile services switching centre reports it in step 4-10.

In step 4-11 the mobile services switching centre is notified of call release and the mobile services switching centre reports the call release to the SCP in step 4-12. Next, the SCP transmits instructions to the MSC to form a charging record (charging ticket) instep 4-13. In step 4-14 the SCP requests the MSC to send the charging data to the billing centre BC and/or to the alternative billing centre ABC (FIG. 3).

The mechanism presented in FIG. 4 differs from a conventional call handling mainly in that messages RequestNotificationCharging and EventNotificationCharging are used when information is transferred on different events between the mobile services switching centre MSC and the control point SCP. It is possible to encode the events in these messages by ASN encoding known per se, in which encoding each parameter has a specified identifier, and the length of a parameter value is indicated in the message.

The above-mentioned prepaid SIM service can be implemented by the following method in which, in connection with the calls for which a subscriber of the mobile station in question is charged:

a data element indicating a remaining prepaid call time is stored on the basis of an identifier (such as IMEI) of the mobile station MS or an identifier of its subscriber (such as IMSI); the identifier in question is determined at the beginning of the call, and an initial value of said data element is set on the basis of the identifier; and the value of the data element is reduced during the call by one of at least two different rates (the call time being reduced or not being reduced);

the control point (SCP) notifies the switching point (SSP) in an instruction message (4-2, 5-7) of the events which affect call price formation and are to be reported by the switching point (SSP) to the control point (SCP) in a report message;

the switching point (SSP) transmits in a report message (4-6; 5-12) data on each said event and on the point of time (t2–t4) of the event in question and, if required, the switching point (SSP) transmits more report messages (4-8, 4-10; 5-14, 5-16) without a separate instruction message; and in response to each report message, the control point (SCP) adjusts said predetermined rate of change of the data element.

The above data element may represent the sum of money the subscriber has paid in advance, or it can be changed to show charging pulses which indicate the duration of the call. This method is illustrated in FIG. 5. Time advances from top to bottom (not linearly, though). Points of time at which the MSC/SSP is notified of the corresponding event are indicated by t1–t5. Text in italics on the right hand side of the figure describes progress of the prepaid call time at a given time. It is here assumed that each subscriber's remaining prepaid call time is stored at the SCP. If the remaining call time is stored elsewhere, it is to be transferred to the SCP at the beginning of the call.

In step 5-1 the mobile station MS transmits an initial message Setup. Steps 5-2 . . . 5-5 and 5-8 . . . 5-10 illustrate a conventional call set-up taking place with the help of an intelligent network, not being described in more detail. The significance of steps 5-6 and 5-7 partly corresponds to the steps 4-1 and 4-2 already described above. In addition, an IDP message of step 5-6 and an RCN message of step 5-7 include a list of call attributes to be reported. This example includes two attributes; the number of channels and a possible call transfer. The IDP message of step 5-6 also includes a time stamp of point of time t1. From this point, the prepaid call time starts decreasing. In this example it is assumed that a mobile-originating data call is involved in which the number of channels change during the call. In a voice call in which a mobile station user calls through a number inquiry, a single-fee tariff can be applied to the prepaid call time and, in addition, a minute tariff can be made more expensive than the normal tariff. In addition, if the call is transferred from the number inquiry to the number of subscriber B, information can be maintained on the fact that call transfer is active, which increases the minute tariff. In step 5-11 the call is temporarily dropped (because of a shadow region, for example), and the MSC/SSP is notified thereof at point of time t2. This is reported to the SCP in step 5-12, and the SCP then interrupts the reduction of the prepaid call time. In step 5-13, at point of time t3, the call is re-established, and the MSC/SSP reports call re-establishment attached with a time stamp t3 in step 5-14. The reduction of the prepaid call time continues at the SCP. In step 5-15, at point of time t4, the MSC/SSP is notified of handover which includes the change in the number of channels or in the frequency range. Let us assume that the tariff then also changes. This is reported to the SCP which starts reducing the prepaid call time by the changed tariff. In this example, the call continues until the prepaid call time charged by the SCP runs out at point of time t5, as a consequence of which the SCP transmits a message Release Call in step 5-17. As a result, the MSC/SSP releases the connections in known manners in optional steps 5-8 . . . 5-21.

FIG. 6 shows a modification of the events of FIG. 5. However, in this case it is assumed that instead of a prepaid call, a call to be charged is involved. Steps 6-1 . . . 6-16 of FIG. 6 correspond to the steps which are correspondingly indicated in FIG. 5, and they are not repeated in FIG. 6. In the case of FIG. 6 it is assumed that call release starts at step 6-17 by a message Release on a wired network PSTN side. Consequently, the call is also released on the mobile telephone network side in steps 6-18 and 6-19. When the call is released, the MSC/SSP notifies the SCP thereof in a message EventReportBCSM in step 6-20. In steps 6-21 and 6-22 the SCP transmits to the mobile services switching centre MSC/SSP a message FurnishChargingInformation, and CallDetailRecord is a parameter to it. In other words, the SCP transmits to the MSC/SSP an accurate charging record which is further transmitted to the billing centre BC or to the alternative billing centre ABC.

FIG. 7 shows charging record parts relevant to the invention. The actual charging record contains much detailed information irrelevant to the understanding of the invention. In the charging record of FIG. 7 it is essential that each event affecting charging includes an accurate time stamp and, thus, the charging can be explained to the subscriber in greater detail, if required.

What is claimed is:

1. A method of reporting events affecting a call tariff in a telephone network utilizing an intelligent network, between a service switching point and a service control point, in which method:

the service control point forms a call price or at least takes part in call price formation on the basis of an existing tariff; comprising:

basing the call tariff formation on at least one attribute representing call state and/or at least one call-related resource, service and/or supplementary service;

forming by the service control point the call tariff at the beginning of tariff monitoring on the basis of an initial value of said at least one attribute of which it has been notified by the service switching point;

notifying the service switching point by the service control point of events the service switching point is to report;

during a call, reporting by the service switching point to the service control point, at least call-related events in which said at least one attribute may change; and in response to the report from the service switching point, re-forming by the service control point the existing call tariff.

2. The method as recited in claim 1, wherein the service switching point reports at least some of the events without a request from the service control point.

3. The method as recited in claim 1, wherein:

a connection without control relationship is established between the service switching point and the service control point;

the events on said connection without control relationship as reported by the switching point.

4. The method as claimed in claim 1, wherein the service switching point reports to the control point resources assigned to the call and/or resources changes.

5. The method as recited in claim 4, the resources comprise transmission connection quality and/or data rate.

6. The method as claimed in claim 1, wherein the service switching point notifies the service control point of the initial state of the resources in an intelligent network activation message.

7. The method as claimed in claim 1, wherein the service switching point reports the events in report messages each of which comprises a corresponding event and/or a point of time at which a resource change takes place.

8. The method as claimed in claim 1, wherein said change in the call tariff is based on at least one of the following: supplementary service activation, call release, call re-establishment, data rate change, entry into and return from a shadow region by a mobile station, and tariff change based on time.

9. The method as claimed in claim 1, wherein said service control point sends said request in a message RequestNotificationCharging.

10. The method as claimed in claim 1, wherein the service switching point reports said events in a message EventNotificationCharging.

11. A method of providing a prepaid call for a mobile station in a mobile communication system comprising a network element, which includes an intelligent network service switching point, comprising in connection with the calls for which a subscriber of the mobile station in question is charged:

storing a data element indicating a remaining prepaid call time on the basis of an identifier of the mobile station or its subscriber; the identifier of said mobile station or its user is determined at the beginning of the call and an initial value of said data element is set on the basis of the identifier; and the value of the data element is reduced during the call by at least one of the two predetermined rates of change;

notifying the switching point by the control point in an instruction message of the events which affect call price formation and are to be reported by the switching point to the control point in a report message;

transmitting by the switching point in a report message, data on each said event and on the point of time of the event in question and, if necessary, the switching point transmits more report messages without a separate instruction message; and in response to each report message, adjusting, by the control point said predetermined rate of change of the data element.

12. A method of reporting events between a service switching point and a service control point in a telephone network utilizing an intelligent network service, in which method a call is modeled by means of a state model and the service control point notifies the service switching point in an instruction message of the events the service switching is to report to the control point in a report message, wherein:

in connection with triggering an intelligent network service, notifying the control point by the switching point of attributes which affect call charging, which attributes comprise:

resources assigned to the call;

call-related supplementary services;

states of the state model parts corresponding to the call; and the service control point requests the switching point to report value changes taking place in the attributes it has enumerated.

13. The method as claimed in claim 12, wherein when the attributes value changes, the switching point transmits, if necessary, more report messages without a separate request from the control point.

14. The method as claimed in claim 13, wherein when the attribute value changes, the switching point attaches a time stamp to the report messages it has sent, the time stamp being based on the clock of the switching point.

15. The method as claimed in claim 14, wherein a connection without control relationship is established between the switching point and the control point.

16. The method as claimed in claim 15, wherein the control point gives the switching point at least one of the following commands on said connection without control relationship:

call release;

request to transmit a charging record or part thereof;

request to transmit a charging message or an AOC parameter; or request to update charging counters between operators.

17. An intelligent network service control point arranged to form a call price or at least to take part in call price formation on the basis of an existing tariff; wherein the service control point is arranged to:

form the call tariff based on at least one attribute representing at least one call-related resource, service and/or supplementary service;

means for notifying the service switching point by the service control point of events the service switching point is to report;

form an initial value of the tariff at the beginning of tariff monitoring on the basis of an initial value of said at least one attribute reported by the service switching point;

receive, during the call, information on call-related events in which said at least one attribute may change;

re-form an existing call tariff in response to the reception of each item of information.

18. A service switching point is arranged to report to an intelligent network control point events which affect call price formation and at least to take part in call tariff formation which is based on at least one attribute characterizing at least one call-related resource, service and/or supplementary service, comprising:

a network element arranged to transmit information to the service control point on call-related events in which said at least one attribute may change in such a way that the transmission of each said item of information does not require a separate request from the service control point; and means for notifying a service switching point by the service control point of the events the service switching point is to report.

19. The service switching point as claimed in claim 18 further comprising a message RequestNotificationCharging for notifying an intelligent network service switching point of events which affect tariff formation and are to be recurrently reported by the service switching point to a service control point during the call.

20. The service switching point as claimed in claim 18 further comprising a message EventNotificationCharging for notifying an intelligent network service control point of recurrent events which affect tariff formation and are encountered by a service switching point.

21. The method as claimed in claim 11, wherein the network element is a mobile services switching centre of the mobile communication system.

22. The service switching point as claimed in claim 18, wherein the network element is a mobile services switching centre of the mobile communication system.

* * * * *